United States Patent [19]

Flahive et al.

[11] 4,449,183

[45] May 15, 1984

[54] ARBITRATION SCHEME FOR A MULTIPORTED SHARED FUNCTIONAL DEVICE FOR USE IN MULTIPROCESSING SYSTEMS

[75] Inventors: Barry J. Flahive, Westford; John J. Grady, III, Woburn; Peter J. Rado, Acton, all of Mass.

[73] Assignee: Digital Equipment Corporation, Maynard, Mass.

[21] Appl. No.: 310,825

[22] Filed: Oct. 13, 1981

Related U.S. Application Data

[63] Continuation of Ser. No. 55,769, Jul. 9, 1979, abandoned.

[51] Int. Cl.$^3$ ............................................. G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,710,324 | 1/1973 | Cohen et al. | 340/172.5 |
| 3,810,114 | 5/1974 | Yamada | 364/200 |
| 3,848,234 | 11/1974 | MacDonald | 364/200 |
| 3,999,163 | 12/1976 | Levy | 364/200 |
| 4,005,391 | 1/1977 | MacPherson | 364/200 |
| 4,009,470 | 2/1977 | Danilenko | 364/200 |
| 4,040,028 | 8/1977 | Pauker | 364/200 |
| 4,056,847 | 11/1977 | Marcantonio | 364/200 |
| 4,059,851 | 11/1977 | Nutter | 364/200 |
| 4,090,239 | 5/1978 | Twibell | 364/200 |
| 4,096,571 | 6/1978 | Mey | 364/200 |
| 4,096,591 | 6/1978 | Vander Mey | 364/200 |
| 4,106,108 | 8/1978 | Cislaghi | 365/222 |
| 4,112,513 | 9/1978 | Elsner | 365/222 |
| 4,121,285 | 10/1978 | Chen | 364/200 |

FOREIGN PATENT DOCUMENTS 1193720  11/1967  United Kingdom .

OTHER PUBLICATIONS

*IEEE Transactions on Computers,* vol. C-21, No. 1, Jan. 1972, "Asynchronous Arbiters", pp. 37-42 by William W. Plummer.

*IEEE Transactions on Computers,* Sep. 1975, "Asynchronous Arbiter Module" by R. C. Pearce et al., pp. 931-932.

*Computer Design,* Aug. 1977, "An Asynchronous Arbiter Resolves Resource Allocation Conflicts on a Random Priority Basis" by K. Hojberg, pp. 120-123.

*Computer Design,* Apr. 1978, "One Step Programmable Arbiters for Multiprocessors" by K. Hojberg, pp. 154-158.

*Primary Examiner*—James D. Thomas
*Assistant Examiner*—David Y. Eng
*Attorney, Agent, or Firm*—Cesari and McKenna

[57] ABSTRACT

An arbitration network for use in a data multiprocessing system that includes a functional unit, such as a memory module, that is shared by several requestor devices, such as data processors, wherein access is granted to the shared functional unit through a common data bus on a rotating priority basis and wherein the arbitration cycle of the functional unit for determining priorities of the requestor devices is performed near the end of each operational cycle of the functional unit so that the next requestor device initiates its operational cycle immediately succeeding a current operational cycle then transacting thereby to minimize idle bus periods which would otherwise occur during arbitration cycle sequencing. When the bus is idle and only one request for access is made, the arbitration network foregoes the complete arbitration cycle and issues the grant to the requesting device thereby providing an earlier initiation of the data transfer cycle of the functional unit.

11 Claims, 5 Drawing Figures

ARBITRATION SCHEME FOR A MULTIPORTED SHARED FUNCTIONAL DEVICE FOR USE IN MULTIPROCESSING SYSTEMS

CROSS-REFERENCE TO RELATED APPLICATIONS AND PATENTS

This is a continuation of application Ser. No. 055,769, filed July 9, 1979, now abandoned.

This application is related to U.S. patent application Ser. No. 845,415 filed Oct. 25, 1977 and Ser. No. 954,601 filed Oct. 25, 1978 which are assigned to the same assignee as the present invention; and to U.S. Pat. No. 3,710,324 issued Jan. 9, 1973 for a DATA PROCESSING SYSTEM and U.S. Pat. No. 3,999,163 issued Dec. 21, 1976 for a SECONDARY STORAGE FACILITY FOR DATA PROCESSING SYSTEM which are assigned to the same assignee as the present invention.

BACKGROUND OF THE INVENTION

This invention relates to arbitration networks for use in digital data processing systems which share access to a functional device. However, to facilitate an understanding of the invention, we have described a system wherein plural processors of a multiprocessing system share a functional device that comprises a multiported memory unit.

A digital processing system comprises three basic elements: namely, a memory element, an input-output element, and a processor element. The memory element stores information at addressable storage locations therein. This information includes data and instructions for processing the data. The processor element transfers information to and from the memory element, interprets the incoming information as either data or instructions, and processes data in accordance with the instructions. The input-output element communicates with the memory element and processor element in order to transfer data to the system and to obtain processed data from the system.

The basic digital data processing system described above may further incorporate several asynchronously and independently operating processors that transfer information over a common bus. Each processor performs its task in response to its own independent clocking system. This elimination of functional interdependance, under certain conditions, makes multiprocessing systems time-wise more efficient than synchronized multiprocessors. Furthermore, a more economical use of processors can be provided in that the complexity of the respective processors may vary according to the nature of operations that each will perform. To further improve time efficiency of multiprocessor arrangements, cache memory systems also may be incorporated in the respective processing systems as disclosed by U.S. Pat. Nos. 3,848,234 issued to MacDonald. Usually, a cache memory will contain copies of data stored at predetermined locations in a usually larger memory, such as a magnetic core memory, that has a slower access time. The use of cache memory provides faster data retrieval to further increase processing speed.

It also has been desirable to provide a multiprocessing arrangement wherein the several data processors thereof share access to the common functional unit in a manner to maintain the high speeds of data processing operations. Particularly, when several devices share a functional unit, processing delays result from idle processing time that occurs while the interconnect logic circuitry performs interconnection of the several devices to shared unit through the common bus. This situation always occurs when the processing devices and functional unit are interconnected through a common data bus.

To further reduce idle processing time, an efficient time sharing network for distributing the use of the common bus among the several devices is required so that no one device may retain access to the shared unit to the exclusion of other devices. Moreover, the arrangement requires a network for resolving conflicts when more than one device simultaneously request use of the common bus. Such networks for accomplishing time sharing and conflict resolution are known as arbiters or arbitration networks.

The arbiter grants access to the shared unit in accordance with certain established priority rules when a conflict situation occurs. These priority rules may be based upon linear selection rules, ring selection rules, or a mixed priority scheme. The linear selection scheme provides conflict resolution in favor of the requesting device that has the highest assigned fixed priority. The ring selection scheme provides, in effect, a round-robin scheduling of priorities so that each device takes its turn being first in line when a conflict arises. This method typically provides for a shift in priority assignment upon each operational cycle of the shared unit. The mixed priority scheme may incorporate both linear and ring selection rules wherein preference is given to particular devices based upon the current and/or prior grant conditions. An arbitration network may also employ a random access rule for granting access, but the assurance of an equal distribution of access time is then sacrificed. In a multiprocessing system where each processor has equal data transfer capability, a priority scheme that gives each processor equal opportunity to use the shared functional unit is generally desirable. To further insure equitable distribution of access time, the arbitration network may keep a service history of each granted access so that it can modify the priority scheme in response to changing conditions and thereby maintain the desired degree of time distribution of access by the various data processing devices.

The arbitration network may be centralized in the shared functional unit, or the network may be decentralized to the extent that each requesting device may contain its own logic circuitry that determines, based upon monitored use activity of the devices, which of the several requesting devices will next acquire access to the shared unit. Whether the arbitration network is centralized or decentralized, the methods of determination of priorities are generally similar.

In operation, when a request for access to the functional unit is made, the arbitration network initiates its decision cycle to determine which requesting device will next be granted access to the functional unit. When the functional unit is busy while performing an operational cycle, all requests made during the busy condition are held until such time as the operational cycle of the functional unit is complete, whereupon decision logic is initiated to determine which device will next have access. Idle bus periods exist between the arbiter and operational cycles as there is typically no overlap between the performance of two cycles. Moreover, even though it is not necessary, the arbitration network is sequenced through its complete cycle when a sole request is present. An immediate grant to a sole requesting device is all that is necessary. Thus, with the use of a typical arbitration network, maximum time efficiency is sacrificed as idle time periods occur on the common data bus during the sequencing of the decision cycle of the arbitration network.

Accordingly, it is one object of this invention to provide an arbitration network that reduces idle time periods on a common data bus that interconnects several data processing devices and a shared functional unit.

It is another object of this invention to provide an arbitration network that, upon receipt of a request from other devices for access to the shared functional unit while the unit is busy with one device, initiates and completes its arbitration cycle prior to the completion of its operational cycle with said one device, and then grants access to one of said other devices having the then highest assigned priority immediately succeeding the current transaction.

It is another object of this invention to provide an arbitration network that, while the system is idle, grants immediate access to a sole requesting device without the necessity of performing its complete arbitration cycle, thereby further reducing idle time periods on said common data bus.

It is yet another object of this invention to employ the herein described arbitration network in a multiported memory unit connected to a multiprocessing system wherein each data processor or controller thereof share the memory unit through a common data bus.

Additional and further objects of the invention will become more readily apparent upon review of the succeeding disclosure taken in connection with the accompanying drawings.

SUMMARY OF THE INVENTION

In accordance with this invention, a plurality of data processing devices are connected to a shared functional unit. The functional unit includes an internal data bus for transferring information to and from the plural processing devices. An arbitration network controls the access of selected ones of the plural processing devices to the shared unit and assures equal use opportunity to each processing device by honoring requests for use on a rotating priority basis. The arbitration network begins its decision cycle to resolve conflicts in requests at a predetermined time prior to the completion of a current operational cycle of several different types of memory operations of the functional unit so that access can be granted to a next selected processing device immediately succeeding the current operational cycle thereby to reduce idle time periods on the internal data bus. When the internal data bus is idle and a sole request is made, earlier access to the functional unit is granted by novel circuitry which detects that condition thereby to provide an earlier initiation of the operation cycle as the complete decision cycle of the arbitration network is bypassed.

In the preferred embodiment, the functional unit includes a metal-oxide semiconductor memory array that requires periodic refreshing. The arbitration network further includes means to inhibit the grant of access memory refresh cycle periods.

The invention is pointed out with particularity in the appended claims. The above and further objects and advantages of this invention may be further understood by referring to the following description of the embodiment taken in connection with the accompanying drawings.

DESCRIPTION OF AN ILLUSTRATIVE EMBODIMENT

It will be helpful in the following discussion to define certain terms respecting signal levels that correspond to logic states. In the detailed drawings, a signal is "asserted" when it is at a positive level and "not asserted" when it is at a ground potential. However, many data processing systems conventionally use "ground assertion" standards, so we show inverters in this disclosure to provide ground assertion signals.

The term "operation cycle" includes a sequence of events occurring when a data processing device or functional unit of a data processing system performs a data transfer operation. When applied to our memory unit, the operational cycle is the memory cycle comprising the sequence of events to retrieve data from the memory elements on a reading cycle, and the sequence of events to store data at an address identifying a location within the memory array on a writing cycle. The operational cycle also includes the process of refreshing data signals of our metal-oxide semiconductor array and the reading or writing of status and control registers of the memory unit.

Figure 1:
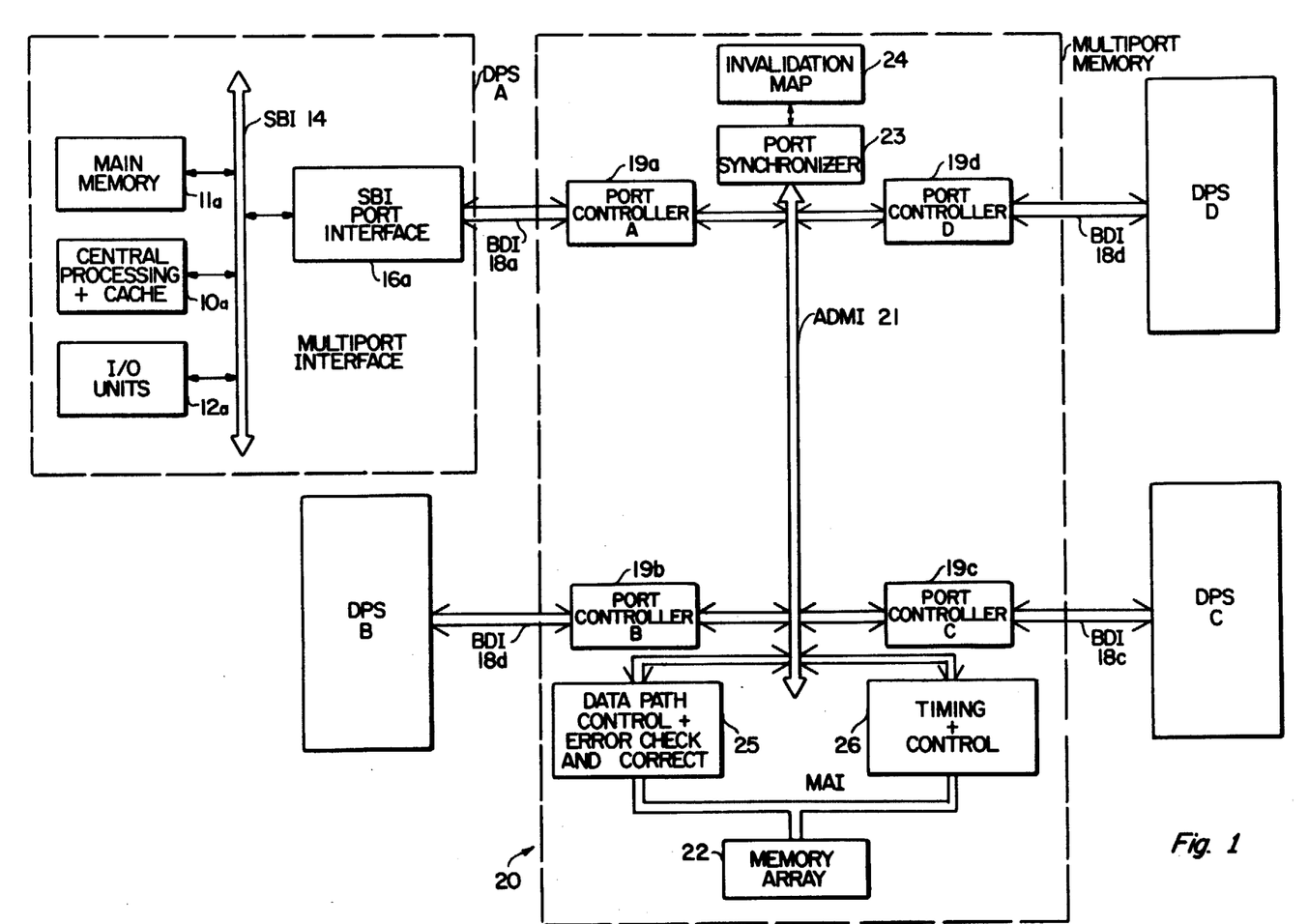
FIG. 1 depicts a basic block diagram of a multiprocessing system incorporating a shared memory unit.

Referring now to FIG. 1, there is shown one embodiment of a multiprocessing system that incorporates the arbitration network of this invention. In the multiprocessing system shown therein, four data processing systems (DPS), A, B, C and D interconnect through a functional unit, such as multiported shared memory unit 20. While the digital data processing systems A through D may have any of a variety of constructions according to this invention, each system in this illustrative embodiment is a system of the type offered commercially by the assignee hereof under the trade designation VAX 11/780. Because the systems A through D are illustratively the same, the basic elements in the system A only are shown in FIG. 1. The structure and operation of the VAX 11/780 system are well known and are described in the aforementioned patents and patent applications, which, insofar as essential material for the support of appended claims is concerned, are incorporated herein by reference. Various VAX 11/780 manuals and related materials published by the assignee also describe the operation of the system.

For the description which follows, reference numerals for a particular one of the corresponding devices of system A, B, C and D will include a suffix a, b, c and d, respectively; and when the entire group of similar devices are referred to, the suffix will be omitted.

The system A comprises a central processor and cache memory unit 10a, memory unit 11a and I/O units 12a. A synchronous backplane interconnection (SBI) 14a interconnects the central processor and cache unit 10a, memory 11a and I/O units 12a. As is known, the SBI 14a in the VAX 11/780 system is the bi-directional information path and communication link for data exchanges among the units. The SBI 14a provides parallel information exchanges in synchronism with its corresponding system clock. A communication protocol allows overlapped communications among the several devices connected thereto so that a number of information exchanges may be in progress simultaneously. Each system A, B, C and D is connected to a shared memory unit 20 through associated interface circuitry 16, associated bi-directional interconnect (BDI) 18, and associated port interface circuit 19. Logic circuitry, to be described subsequently, within the shared memory unit 20 performs interconnect arbitration, information transfer, and transfer confirmation in conjunction with any of the DPS's A, B, C or D without regard to the status of the respective clocks of the DPS's.

Each of the port interface circuits 16 arbitrates among other devices, such as memory 11a, control processor 10a, and I/O units 12a, which are connected to SBI 14a for the transmission of read data, cache invalidate commands, and/or interrupt information. Each of the SBI port interface circuits 16 also includes output buffers (not shown) that buffer information to be transferred from the memory 20 to the SBI 14. A port configuration register (not shown) for indicating the status of the memory port and a port interface control register (not shown) also are embodied in each of the interface circuits 16 and can be read or written by the associated data processing system without a transmission on its bi-directional interconnect 18.

Now, memory unit 20, which serves as the functional unit, includes an internal data bus ADMI 21, respective port controllers 19, port synchronizer 23, invalidation map 24, memory array 22, data path control and error check and correct circuit 25, and timing and control circuit 26.

The ADMI bus 21 provides bi-directional data transfers between the memory array 22 and each of the port controllers 19. Those data transfers are synchronized and timed, respectively, by port synchronizer 23 and timing and control circuitry 26. Data are buffered on each transfer to and from memory array 22 through a command buffer and an output buffer (not shown) of each of the respective port controllers 19. Port-to-port interrupt registers (not shown) for allowing interport register communication are also included in the respective port controllers 19. This feature is useful for the monitoring of port status of any system by any other system connected to the shared memory unit 20.

An invalidate map 24 is used by synchronizer 23 to keep track of addresses which may contain invalid data in the cache memories of each system A, B, C and D.

The error correction and checking and data path circuitry 25 provides temporary storage and error checking of write data taken from the internal ADMI bus 21 and read data from the memory array 22. A description of operation of the data path and control and error check and correction circuitry 25 is contained in the aforementioned related U.S. patents and applications.

Each processing system A, B, C, and D may issue read data commands, write data commands, or internal status and control register read/write commands in connection with the operation of the memory 20. For each read data and write data command so issued, the associated port controller 19 receives command/address/mask data words together with identification and function bits from the associated BDI 18. The corresponding port controller 19 then decodes the data word, checks the command buffer for data word storage availability, and also checks for parity errors in the data word. The address associated with the command data word will be translated to an array address and then evaluated to determine whether the physical address indicated thereby is contained in the memory unit 20. If so, that information will then be placed in the command buffer of the port controller, if the buffer is not full. The port controller 19 will then notify its associated port interface circuit 16 when the command is accepted. An acknowledgement is then sent to the associated SBI 14 by the associated interface circuitry 16. Once the entire command and its associated write data, if any, is assembled in a port controller command buffer, that particular controller will then issue a request for access to memory array 22 by asserting a PORT (n) REQ signal on its associated request line "n". In our preferred embodiment, each port controller 19 has a separate request line for placing a REQUEST signal on the ADMI bus 21. Those signals are subsequently received by the arbitration network which also is connected to the ADMI bus 21.

Figure 2:
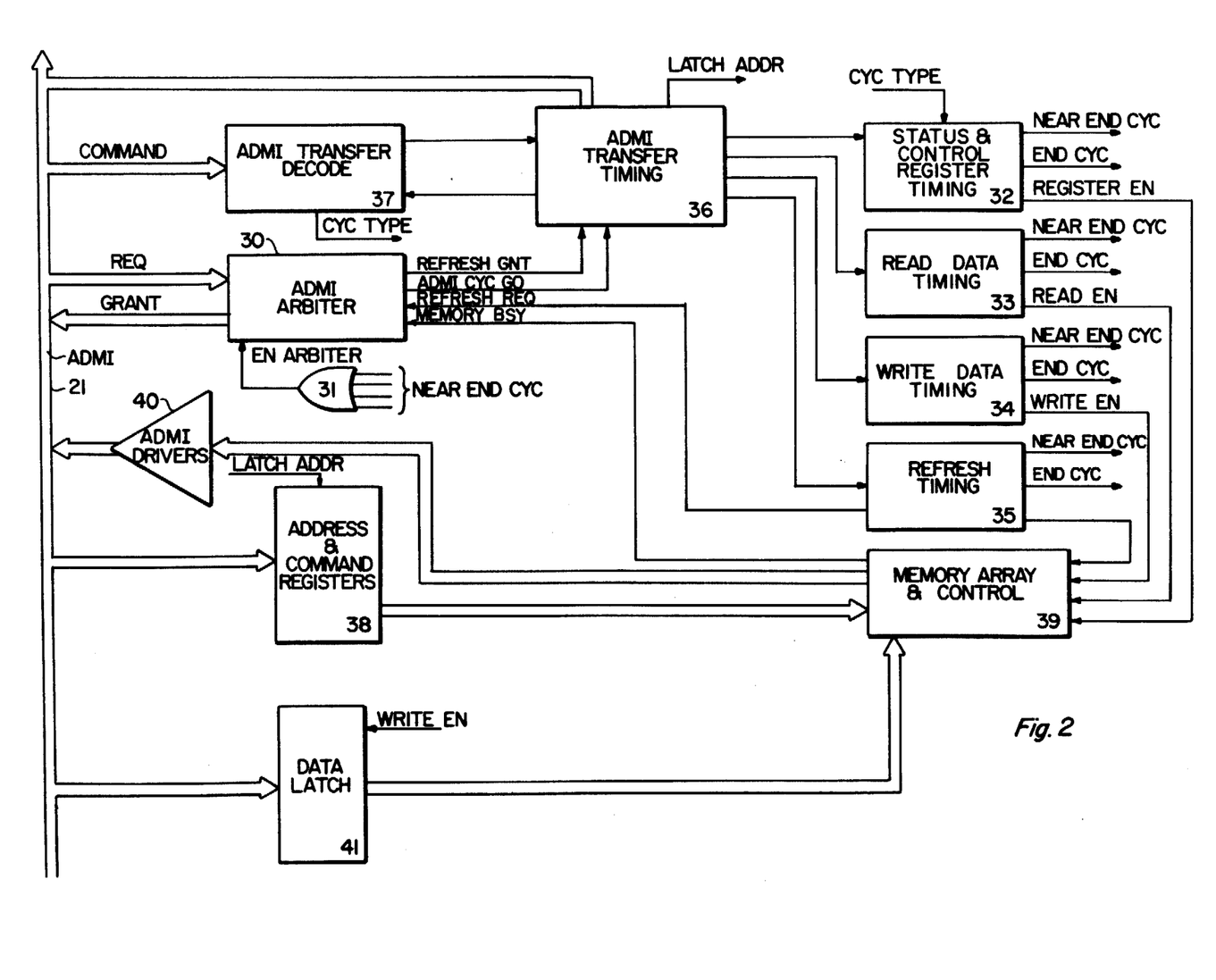
FIG. 2 depicts a detailed block diagram of a portion of the data multiprocessing system that incorporates the arbitration network of the subject invention.

The logic sequence and circuitry for receiving REQUEST signals, issuing GRANT signals, and determining priorities will be better understood by referring to FIG. 2. The execution time for each command, and correspondingly, the exact time of initiation of the arbitration cycle, is determined by conventional delay lines (not shown) of the respective read data timing circuit 33, write data timing circuit 34, refresh timing circuit 35, or status and control register timing circuit 32. These timing circuits generate NEAR END CYC signals which precondition the initiation of the arbitration decision logic cycle through an OR gate 31 upon the assertion of an EN ARBITER signal.

The arbiter circuit 30 receives REQ signals from the ADMI bus 21 through separate request lines associated with respective ports. Depending upon the conditions existing at the time of a request or requests, a GRANT signal for a selected one of the ports is then placed upon a corresponding port grant line of the ADMI bus 21 by the arbiter circuit 30. That GRANT signal is subsequently received by the respective port controller to initiate an ADMI transfer cycle.

Assuming the REFRESH REQ signal has not been asserted and a request has been granted, arbitration circuitry 30 asserts an ADMI CYC GO signal that initiates ADMI transfer timing circuitry 36 to retrieve address information for read or write commands, and additionally write data information for write commands, that are located in the command buffer of the requesting port controller 19. The ADMI transfer timing circuit 36 causes the selected port controller 19 that has been granted access to place the command/address/mask data on the ADMI bus 21 and, if a write command, causes the address and command register 38 to latch write data and the mask portion of the command/address/mask data word. ADMI transfer decode circuitry 37 decodes commands from that information and identifies the type of cycle to be initiated.

If the command is a read command, then the read data timing circuitry 33 is started so that the appropriate data in memory array and control circuitry 39 can be retrieved. The retrieved information is then placed onto the ADMI bus 21 through ADMI drivers 40. If the command is a write command, the ADMI transfer decode circuitry 37 causes the ADMI transfer timing circuit 36 to initiate another ADMI transfer that enables data latch 41 to latch write data that was placed on the ADMI bus 21. The latched data is then transferred to the memory array 39 under control of write data timing circuitry 34.

As previously indicated, timing circuits 32, 33, 34 and 35 have known cycle periods for their respective operations. Prior to the completion of each operational cycle, a NEAR END CYC signal is asserted to initiate the decision cycle of arbitration logic circuitry 30. In the embodiment disclosed herein, the NEAR END CYC signal is asserted approximately 200 nanoseconds prior to the end of the respective operational cycles. At the beginning of the allotted 200 nanosecond time period, the arbiter circuit is enabled to receive all requests for access, and then resolves conflicts, if any, among requesting ports before the end of the operational cycle. The preferred arbiter network completes its decision cycle in approximately 120 nanoseconds.

When the ADMI bus 21 is idle, that is, when there are no data transfers occurring, the first request made is granted access to the memory array by "no tie" determination circuitry, to be subsequently described. This circuitry foregoes the arbitration decision cycle and grants access within approximately 45 nanoseconds.

Arbitration and grants are suspended when a memory refresh request is made. A memory refresh request has inherent priority over requests from all other processing devices. Such requests are made periodically to maintain data signal levels of the MOS type active memory elements that are used in the shared memory module of our preferred embodiment. The assertion of the periodic REFRESH REQ signal by the refresh timing circuitry 35 will automatically assert a REFRESH REQ signal which inhibits all GRANT signals produced by arbiter circuit 30. Upon receiving a REFRESH REQ signal, ADMI transfer timing circuitry 36 starts the refresh timing through refresh timing circuitry 35. When the refresh cycle is complete, the arbiter circuit returns to its normal state of operation of granting accesses. For the embodiment, refresh requests are made periodically and approximately every 13 microseconds.

Figure 3:
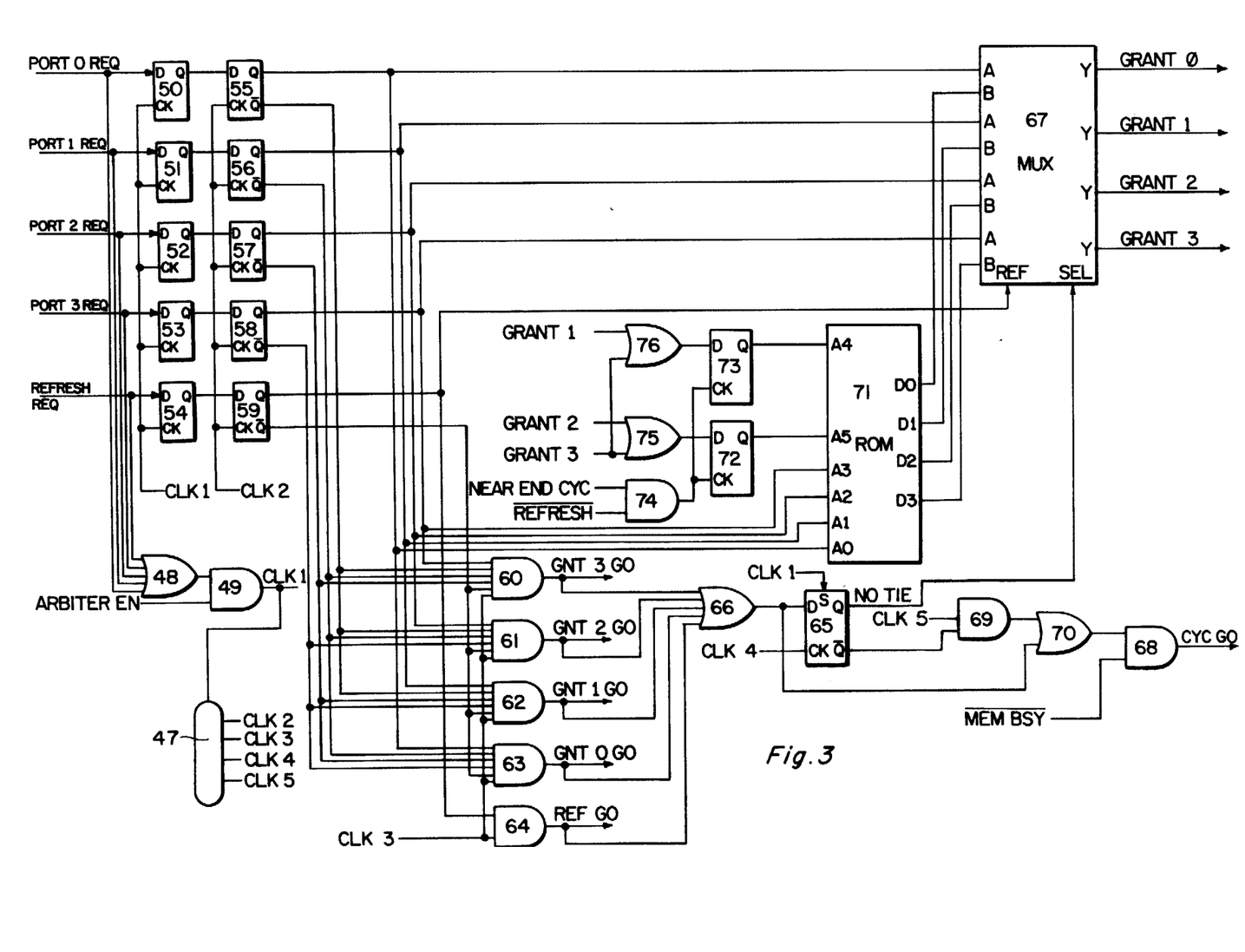
FIG. 3 illustrates a detailed circuit diagram of an arbitration network that may be used with this invention.

An example of an arbitration circuit that may be used in our invention is shown in FIG. 3. In the preferred embodiment, this circuit is incorporated in the timing and control circuitry 25 of the multiport memory unit shown in FIG. 1.

The circuit of FIG. 3, at first stage latches 50 through 54, receives PORT 0 REQ, PORT 1 REQ, PORT 2 REQ, and PORT 3 REQ signals, hereinafter called request signals, from the ADMI bus 21 when at least one of said signals and the ARBITER EN signal are asserted. The request signals are asserted asynchronously by the requesting ports. If a request signal is asserted, a CLK 1 pulse is generated at AND gate 49 when the ARBITER EN signal is asserted. The assertion of the ARBITER EN signal was explained in connection with the discussion of FIG. 2.

A delay line 62 establishes subsequent clocking pulses for sequencing the arbitration decision logic. The CLK 1 pulse begins the sequence. Delay line 62, in response to the CLK 1 pulse, subsequently produces CLK 2, CLK 3, CLK 4 and CLK 5 pulses at 30 nanoseconds, 45 nanoseconds, 75 nanoseconds, and 120 nanoseconds, respectively.

The two stage latch arrangement comprising latches 50 through 54 at the first stage thereof and latches 55 through 59 at the second stage thereof are successively clocked by CLK 1 and CLK 2 pulses. The double stage latch arrangement provides a greater certainty that the outputs of the latches 55 through 59 will be unchanging while the decision logic is operating.

Upon the occurrence of the CLK 1 pulse, data latch 65 is preset to a "no tie" condition to assert a NO TIE signal thereat which preconditions multiplexer 67 to couple the Y outputs to the A inputs. This coupling makes ready the arbiter circuitry to grant access to a sole requesting port access should a "no tie" condition exist. Under "no tie" conditions, the actual grant is processed upon the assertion of the CYC GO signal from AND gate 68 which occurs on the CLK 3 pulse assuming the MEM BSY signal, which disables the AND gate 68, is nonasserted. A "no tie" detection circuit comprises OR gate 66 and AND gates 60 through 64. Only one of the AND gates 60 through 64 can be asserted under any given input condition. That condition is a "no tie" condition among request signals as detected by second state latches 55 through 59 on the CLK 2 pulse. OR gate 66, then, will be energized during the CLK 3 pulse, thereby to energize OR gate 70 and enable AND gate 68 to start ADMI timing circuit 36 of FIG. 2 to process the transfer request then asserted through multiplexer 67. As previously indicated, that request was granted on the CLK 1 pulse. Thus when the bus is idle and a sole request is made, the ADMI CYC GO signal from AND gate 68 provides an early start for the ADMI transfer cycle. The CYC GO signal is asserted on the CLK 3 pulse, rather than the CLK 5 pulse. It then follows that this invention improves the time utilization of a common data bus as the number of sole requests occurring at idle conditions increases. Rather than granting a request at 120 nanoseconds after initiation of the arbiter cycle, the grant is made at 45 nanoseconds after initiation. A time saving of 75 nanoseconds is provided.

If a "tie" condition exists, the output OR gate 66 will remain nonasserted to indicate a "tie" condition which signal is clocked into data latch 65 on the CLK 4 signal. The nonasserted NO TIE signal then preconditions multiplexer 67 to couple its Y outputs to its B inputs which causes the grant signals to be based upon the priority determination circuitry including read-only-memory (ROM) 71. The GRANT (n) signals are determined by the D0, D1, D2, and D3 signals then present at addressed locations in ROM 71.

Those signals are based upon the current priorities, which are determined by data contents of a two-bit register comprising flip-flops 72 and 73, the outputs of which are applied to address selection inputs A4 and A5 of ROM 71. A port which has been granted access becomes last in line to be granted access on the next succeeding arbiter cycle. AND gate 74 clocks flip-flops 72 and 73 upon the occurrence of a NEAR END CYC signal from any one of the timing circuits 32 through 35 of FIG. 2 on condition that the memory array is not being refreshed. For determination of priorities during tie conditions, OR gates 75 and 76 receive the GRANT 1, GRANT 2, AND GRANT 3 signals to produce four possible conditions at the outputs of flip-flops 72 and 73.

Based upon the port most recently granted access, the following table represents the four possible conditions represented by data signals D0, D1, D2 and D3 contained at addresses in ROM 71 as defined by address selection signals A0 through A5.

| (previous grant) | FLIP-FLOPS | | PORT PRIORITIES | | | |
|---|---|---|---|---|---|---|
| | 75 | 76 | HIGH | | | LOW |
| GRANT 0 ASSERTED | 0 | 0 | 1 | 2 | 3 | 0 |
| GRANT 1 ASSERTED | 0 | 1 | 2 | 3 | 0 | 1 |
| GRANT 2 ASSERTED | 1 | 0 | 3 | 0 | 1 | 2 |
| GRANT 3 ASSERTED | 1 | 1 | 0 | 1 | 2 | 3 |

The outputs of flip-flops 72 and 73 and the PORT (n) REQ signals are applied to address selection inputs A0 through A5 of read-only-memory 71 to cause a priority translation of the several PORT (n) REQ signals to the data signals D0, D1, D2, and D3 which are then transformed to grant signals by multiplexer 67. The data contents of ROM 71 provide that each time a port has been granted access, it becomes last in line to receive a grant in respect to the other requesting devices.

The grant is processed upon assertion of the CYC GO signal at AND gate 68 as previously indicated, but not until the occurrence of the CLK 5 pulse. This happens because the $\bar{Q}$ output of latch 65 becomes asserted with a "zero" from OR gate 66 was clocked therein on the CLK 4 pulse. Therefore, the resulting "one" signal at the Q output of latch 65 enables AND gate 69 on the CLK 5 pulse. The output of the AND gate 69 then enables AND gate 68 after passing through OR gate 70. The assertion of the CYC GO signal at AND gate 68 initiates ADMI timing circuitry 36 as previously explained.

The GRANT (n) signal and the CYC GO signal are then applied to their respective grant lines on the ADMI bus 21 to cause a coupling of the requesting device (processor) to the functional unit (memory array).

The REFRESH REQ signal from latch 59, when asserted, will inhibit AND gates 60, 61, 62 and 63 and assert a REF GO signal at AND gate 64 to initiate the refresh timing cycle. This signal also inhibit all GRANT (n) signals generated at multiplexer 67. The REFRESH REQ signal is periodically asserted and internally generated by the timing and control circuitry 25 and also acts to inhibit GRANT signals at multiplexer 67.

Figure 4:
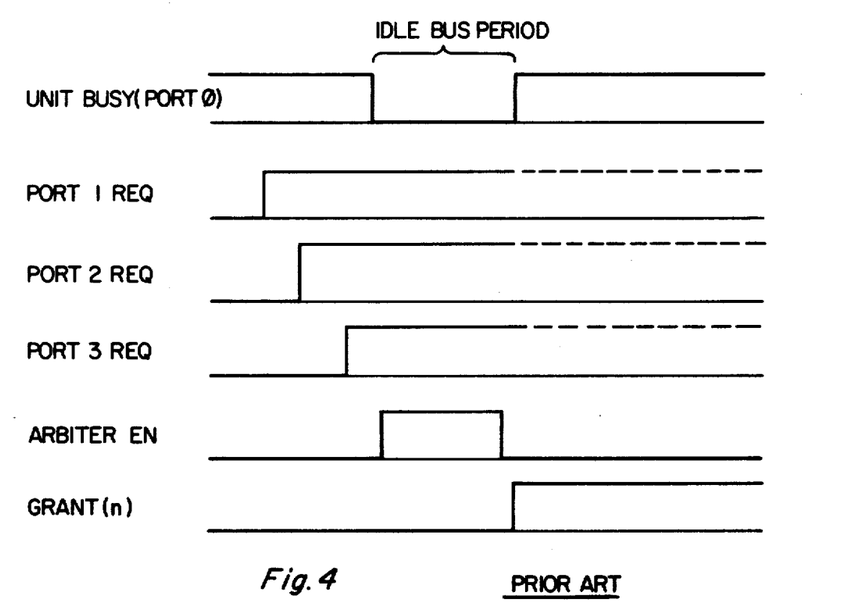
FIG. 4 is a timing diagram that shows the relationship among the signal activities of the plural requesting devices and the arbitration network of prior art systems.
Figure 5:
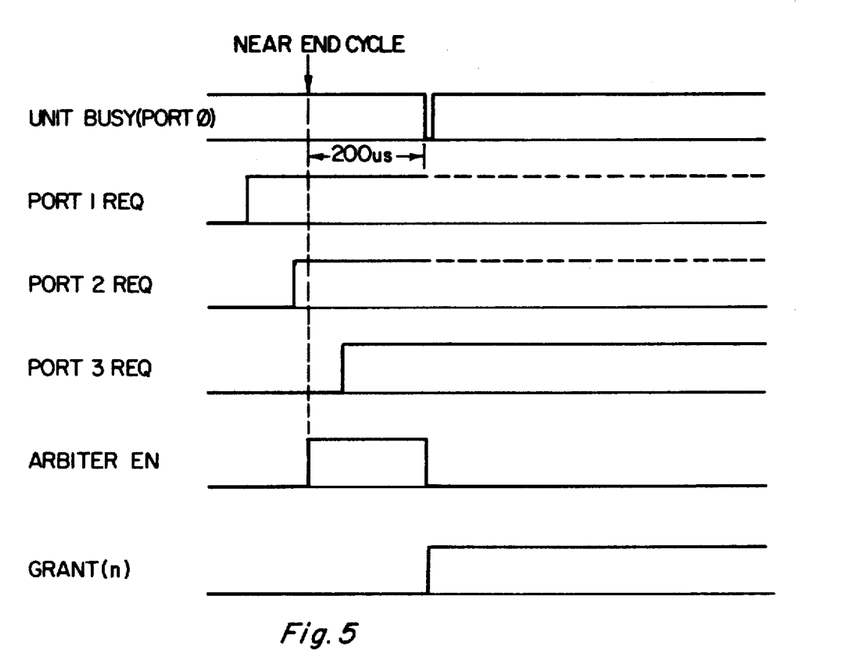
FIG. 5 is a timing diagram that shows the relationship among the signal activities of the plural requesting devices and the arbitration network of this invention.

The advantages of this invention are more clearly illustrated in FIGS. 4 and 5 wherein timing diagrams showing the differences in bus activities on the shared buses of our system and prior art systems can be visually compared. Port 0 is shown occupying the bus as the UNIT BUSY signal. Assuming PORT 1 REQ, PORT 2 REQ, and PORT 3 REQ signals are asserted at the indicated relative points in time for both the prior art system (FIG. 4) and this invention (FIG. 5), it can be seen that bus utilization in this invention is greater because the period of arbitration, e.g. ARBITER EN signal, initiates at the NEAR END CYC signal and occurs prior to the completion of the UNIT BUSY signal, and a GRANT (n) signal is asserted immediately succeeding the UNIT BUSY signal rather than at the end of the ARBITER EN signal as shown in the prior art characteristic timing chart (FIG. 4). At the occurrence of the NEAR END CYC signal (FIG. 5), only the PORT 1 REQ and the PORT 2 REQ signals, however, are latched. A grant will be made to port 1 or port 2. The request of port 3 will remain for consideration on the next arbiter cycle. Thus, idle bus periods, which may consume a substantial portion of data transfer capability, are eliminated.

In summary, the circuitry shown in FIG. 3 and the particular location within the data multiprocessing system that is shown and described are illustrative. Although a memory device was set forth as the functional unit, it will be apparent that arbitration circuits can be employed among many types of elements of a data multiprocessing system wherein several requestor devices may simultaneously request access to a functional unit. Accordingly, it is the intent that the appended claims cover all arrangements, adaptations, or modifications as come within the true spirit and scope of this invention.

What is claimed as new and desired to be secured by Letters Patent of the United States is:

1. In a memory means for use in a data-processing system that includes plural requesting devices adapted to be enabled by receipt of grant signals, each requesting device generating request signals associated therewith and transmitting its associated request signals to said memory means, said memory means including storage locations, connection means for transferring information between said requesting devices and said storage locations, and memory-cycle control means operable by application of a start signal thereto to begin performance of a memory operation in which information is transferred over said connection means between said storage locations and an enabled requesting device and for subsequently generating an enabling signal to indicate that an arbitration operation can be commenced, an arbitration network comprising:

A. priority-determination means, connected to receive said request signals from said requesting devices, for determining priority and generating a grant signal associated with a requesting device determined according to a predetermined priority rule, priority determination by said priority-determination means commencing with said enabling signal if a request signal has been sent by a requesting device;

B. sole-request-detection means, connected to receive said request signals from said requesting devices, for transmitting a start signal to said memory-cycle control means in response to a sole-request condition before said priority-determination means has determined priority; and C. arbitration-control means connected to receive said request signals from said requesting devices and said grant signals from said priority-determination means, said arbitration-control means being initiated by said enabling signal, if a requesting device generates a request signal, to forward as grant signals, if said sole-request-detection means detects a sole-request condition, request signals received from said requesting devices, and, if said sole-request-detection means has not detected a sole-request condition, to forward the grant signal from said priority-determination means to the requesting device associated with that grant signal and transmit a start signal to said memory-cycle control means after said priority-determination means has determined priority, a memory cycle thereby being started before priority determination has been finished if only one requesting device requests access to the memory.

2. An arbitration network as recited in claim 1 wherein said memory-cycle control means comprises plural timing means for controlling respective memory operations of different time durations, each said timing means generating an enabling signal during a memory operation at a time early enough in that memory operation to permit said priority-determination means to determine priority before completion of that memory operation.

3. An arbitration network as recited in claim 2 wherein said priority-determination means comprises addressable memory means having address-select input means for receiving address-select signals that select address locations therein and output means for producing said priority-determination-means grant signals based upon information stored at said address locations, said address-select input means receiving select-address signals including one of said grant signals forwarded by said arbitration-control means during a preceding memory operation and also including one of said request signals from said requesting devices.

4. An arbitration network as recited in claim 3 or 2 wherein one of the requesting devices is a refresh means for generating memory refresh cycles to refresh the information contained in said memory means and for generating a refresh signal for requesting the refreshing of said memory means, and said priority-determination means includes means responsive to said refresh signal for inhibiting access to said memory means by the other requesting devices during memory refresh cycles.

5. An arbitration network as recited in claim 4 further including a two-stage latch network providing the connection of said priority-determination, arbitration-control, and sole-request-detection means to said requesting devices, said latch network being successively clocked at each stage thereof by succeeding clock pulses after the assertion of the enabling signal, the first stage being adapted to receive and store said request signals and the second stage being adapted to receive and store said request signals stored in said first stage thereby to provide a stable indication of the request signals from said requesting devices.

6. A multiport memory means for use in a data processing system that includes plural requesting devices adapted to be enabled by receipt of grant signals, each requesting device generating request signals associated therewith and transmitting its associated request signals to said memory means, said memory means including storage locations, connection means for transferring information between said requesting devices and the storage locations, and memory-cycle control means operable by application of a start signal thereto to begin performance of a memory operation in which information is transferred over said connection means between said storage locations and an enabled requesting device and for subsequently generating an enabling signal to indicate that an arbitration operation can be commenced, said memory means further including an arbitration network comprising:

A. priority-determination means, connected to receive said request signals from said requesting devices, for determining priority and generating a grant signal associated with a requesting device determined according to a predetermined priority rule, priority determination by said priority-determination means commencing with said enabling signal if a request signal has been sent by a requesting device;

B. sole-request-detection means, connected to receive said request signals from said requesting devices, for transmitting a start signal to said memory-cycle control means in response to a sole-request condition before said priority-determination means has determined priority; and C. arbitration-control means connected to receive said request signals from said requesting devices and said grant signals from said priority-determination means, said arbitration-control means being initiated by said enabling signal, if a requesting device generates a request signal, to forward as grant signals, if said sole-request-detection means detects a sole-request condition, request signals received from said requesting devices, and, if said sole-request-detection means has not detected a sole-request condition, to forward the grant signal from said priority-determination means to the requesting device associated with that grant signal and transmit a start signal to said memory-cycle control means after said priority-determination means has determined priority, a memory cycle thereby being started before priority determination has been finished if only one requesting device requests access to the memory.

7. A multiport memory means as recited in claim 6 wherein said memory-cycle control means includes a read timing-cycle means, a write timing-cycle means, and a refresh timing-cycle means for controlling the timing of read, write, and refresh memory operations, respectively, each timing-cycle means generating said enabling signal during its respective memory operation at a time early enough in that memory operation to permit said priority-determination means to determine priority before completion of that memory operation.

8. A multiport memory means as recited in claim 6 wherein said memory-cycle control means generates said enabling signal during a memory operation at a time early enough in that memory operation to permit said priority-determination means to determine priority before completion of that memory operation.

9. A multiport memory means as recited in claim 8 wherein said priority-determination means includes addressable memory means having address-select input means for receiving address-select signals that select address locations therein and output means for producing said priority-determination-means grant signals based upon information stored at said address locations, said address-select input means receiving address-select signals including one of said grant signals forwarded by said arbitration-control means during a preceding memory operation and also including at least one of said request signals.

10. A multiport memory means as recited in claim 8 or 9 wherein one of the requesting devices is a refresh means for generating memory refresh cycles to refresh the information contained in said memory means and for generating a refresh signal for requesting the refreshing of said memory means, and wherein said arbitration-control means includes means responsive to said refresh signal for inhibiting access to said memory means by the other requesting devices during memory refresh cycles.

11. A multiport memory means as recited in claim 10 wherein said arbitration network further includes a two-stage latch network providing the connection of said priority-determination, arbitration-control, and sole-request-detection means to said requesting devices, said latch network being successively clocked at each stage thereof by succeeding clock pulses after the assertion said enabling signal, the first stage being adapted to receive and store said request signals and the second stage being adapted to receive and store said request signals stored in said first stage thereby to provide a stable indication of the request signals from said requesting devices.

* * * * *